United States Patent
Poirier

[11] 3,757,121
[45] Sept. 4, 1973

[54] MOVEMENT OF A MOVABLE COMPONENT OF AN AIRPLANE
[75] Inventor: Albert Poirier, Saint-Benoit, France
[73] Assignee: Ulmic S. A., Paris, France
[22] Filed: Apr. 17, 1972
[21] Appl. No.: 244,539

[52] U.S. Cl ........... 250/316, 250/71 R, 250/106 VC
[51] Int. Cl. ............................................... G01j 1/02
[58] Field of Search ................. 250/83.3 UV, 71 R, 250/106 VC

[56] References Cited
UNITED STATES PATENTS
3,098,302  7/1963  Stewart ........................ 250/106 VC
3,285,533  11/1966  Jernigan, Jr. ............... 250/106 VC X
3,458,159  7/1969  Campanella ............... 250/106 VC X
3,629,583  12/1971  Plasser et al. ............. 250/106 VC X Primary Examiner—Archie R. Borchelt
Attorney—William B. Kerkam, Jr. et al.

[57] ABSTRACT

The movement of a movable component of an airplane wing is measured by a transmitter of pin point radiation on the component. A directional receiver sensitive to the radiation is mounted on the support for the component. The curve described by the source with respect to the receiver is recorded and compared with a theoretical reference curve.

10 Claims, 4 Drawing Figures

MOVEMENT OF A MOVABLE COMPONENT OF AN AIRPLANE

BACKGROUND OF THE INVENTION

The present invention concerns a procedure for controlling the clearance of a movable component, and is specially although not exclusively applied to the wing flaps or ailerons of an airplane, in order to check the trajectory of their course with respect to the wing or the empennage which supports them.

Verification of the precise position of a moving component and particularly of the wing flaps or other modifying elements, by the control of the pilot, the profile of a wing of a plane in order to change its lift or its drag, particularly during the phases of taking off and landing, are of great importance for safety during the flight. Normally, we also know that these movable elements are guided on rails with profiles which are very carefully calculated, which are supported by fixed beams which are installed in the wing of the plane, the movement of the wing flaps installed on these rails is obtained through appropriate mechanical means such as hydraulic jacks or electrical motors which drive the rollers supporting these wing flaps by means of a screw-nut system. The profile and the position of these rails depend evidently on the curve described by a specific point of the wing flap; thus many factors may contribute to distort the guiding rails, such as the shock of the wings during the flight on the different layers of the atmosphere when passing for instance through an air pocket, the stress exerted when making more or less tight turns, the accelerating and reducing of speed during the taking off or landing manouvers, etc., the moment of inertia of the wing also varying in certain types of airplanes according to the quantity of fuel which they transport and at least partially store in the wing.

A defective positioning of the wing flaps or other movable components of the apparatus may result which may interfere with the behavoir of the plane by decreasing its stability and its lift coefficient.

The control and verification of the wing flaps of an airplane which is of importance as explained above, is done actually when the airplane is on the ground by means of a reference gauge, through direct optical sighting, whereby the distance between this gauge and the end of a rod fixed with two clips or analogous structure on the trailing edge of the wing flaps to be checked, in a position set as exactly as possible with respect to a reference surface, which is generally a plane tangent to the under-surface of the wing flap. This method is nevertheless limited, and of an uncertain accuracy and requires a number of persons as well as heavy and cumbersom equipment.

The present invention concerns a procedure for an automatic control of the movements of a movable component, particularly the wing flaps or ailerons of an airplane, avoiding such inconveniences, by using simple and inexpensive means to achieve a remarkable precision of measurements and speed of implementation during which the plane may be on the ground or in flight.

SUMMARY OF THE INVENTION

Thus in order to achieve this result the process consists in connecting with a fixed point of the movable part to be controlled, a pin-point transmitter of radiation and to set in a reference position, which is fixed with respect to the support of the movable part, a directional receptor which is sensitive to said radiation, and to record with said receiver the curve described by the transmitter at the time of movement of the movable part and to compare said registered curve with a corresponding curve of reference for the theoretical movement of said component.

In the particular case of wing flaps or ailerons of an airplane, the comparison thus made between the curve of reference provided by the airplane manufacturer, which corresponds to the exactly calculated profile and undistorted profile of the guide rails of the wing flaps, and the recorded curve, allows the pin pointing and immediate evaluation of the size of the errors revealed, and thus permits proceding with the necessary corrections. It is understood that the comparison of the two curves, which are traced and recorded on the same scale, can only furnish a valid result if both have the same origin. To this end and following a special feature of the present process, the origin of the recorded curve is reset by the receiver in relationship with two fixed guide sights, connected with the support of the movable component. Furthermore, in the case of several movable components, particularly several wing flaps, each movable part is associated with a different pin-point transmitter and the curves are registered simultaneously or separately with one process, shared by all the transmitters.

According to another particular feature of the process, said pin pointing transmitter associated with each movable component is composed of a source of ultra violet rays and said receiver by a camera with a variable focusing lense the shutter of which is permanently opened in front of a film which is sensitive to ultra violet rays and not sensitive to the surrounding light. A positive or negative proof is then made of said film where the tracing of the curve of the transmitter and of the guide sights appears by contrast.

A retractable shutter may be set before each transmitter, remotely controlled for a separate registering of the curves of each movable component or on the other hand each transmitter can include of a source of monochromatic light which differs from one transmitter to the other, allowing the simultaneous recording of all the curves on the same sensitive film.

According to other embodiments, said transmitter may include a heated electrical wire, which provides infra red rays, or by a deposit of luminescent paint or any other source of radiation, said receptor being selected according to the nature of said radiation.

The invention relates also to a set of measures for the application of the above mentioned procedure, including a pin point transmitter of radiation connected with the movable component to be checked, a directional receiver fixed with respect to the support of the movable component and sensitive to said radiation, means for recording the curve traced by said transmitter at said receiver and means for comparing and measuring the differences between the recorded curve and the theoretical curve of reference.

BRIEF DESCRIPTION OF THE DRAWING

Other characteristics of the invention will be shown also in the following description of a preferred embodiment, given as an indicative but not limiting example, with reference to the accompanying drawings in which:

FIG. 4 is a schematic diagram of the different elements of the comparing apparatus.

DESCRIPTION OF THE PREFERRED EMBODIMENTS

Figure 1:
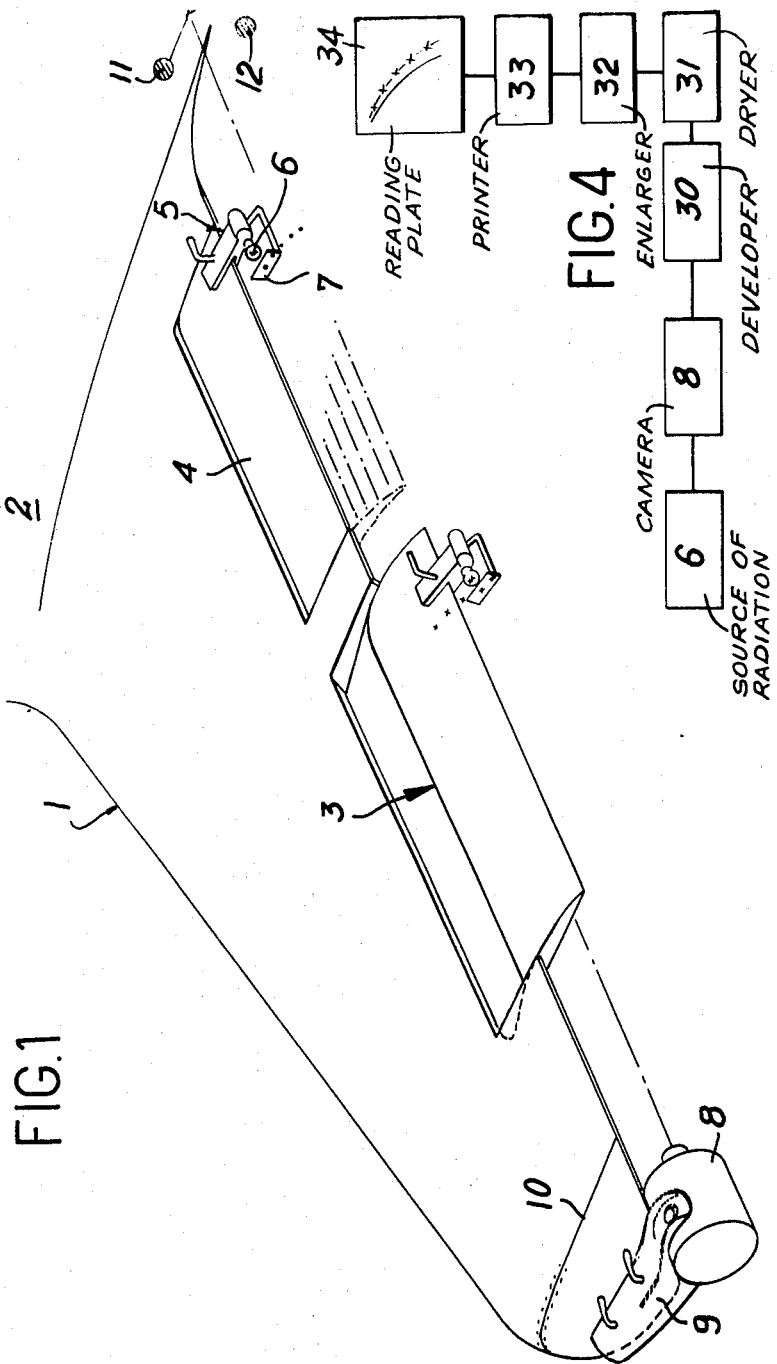
FIG. 1 is a diagrammatic view in persepctive of the measuring means used for the application of the control procedure, applied to the flaps of an airplane wing.

As seen in FIG. 1, 1 is a wing of an airplane the fuselage of which is very partially shown at 2. On the rear part at the trailing edge of wing 1, are mounted two movable wing flaps in the example shown, but more flaps could be present according to the type of airplane and of more complex structure. Wing flaps 3 and 4 can be moved with respect in wing 1 to a clearing movement, particularly back and down from the wing, in order to vary the lift of airplane during the landing and taking off.

According to the present invention, the control of the tolerance measurement between the real clearance curve of the wing flaps 3 and 4 and the theoretical curve, are made with measuring means, comprising mechanical means for fixing the control devices on the wing and the wing flaps, recording means and finally means for appraising the results obtained. This measuring means comprises particularly a clip 5, which can be affixed on the end of each wing flap 3 and 4, a source of radiation 6 in the plane tangent to surface at the under-surface of the wing flap or in a position exactly located with respect to it which in the embodiment considered, is a source of ultra violet light. In front of source 6 is a shutter 7 which can be retracted remotely controlled by any appropriate means (not shown) and arranged in such way that in a position when retracted, source 6 is visible to a camera 8, mounted on a support 9, which in turn is secured with set screws or other means of locking on the end of the trailing edge of the wing 1. Furthermore in order to allow th optical adjustment of the camera 8 with respect to the wing and particularly to set the position of its sighting axis, the fuselage 2 of the airplane carries near the rear end of wing 1 two fixed sights 11 and 12, seen simultaneously by the lense of the camera 8, the position of which on a sensitive film contained in the camera allows the resetting of the recording obtained with respect to a fixed origin.

Figures 2, 3:
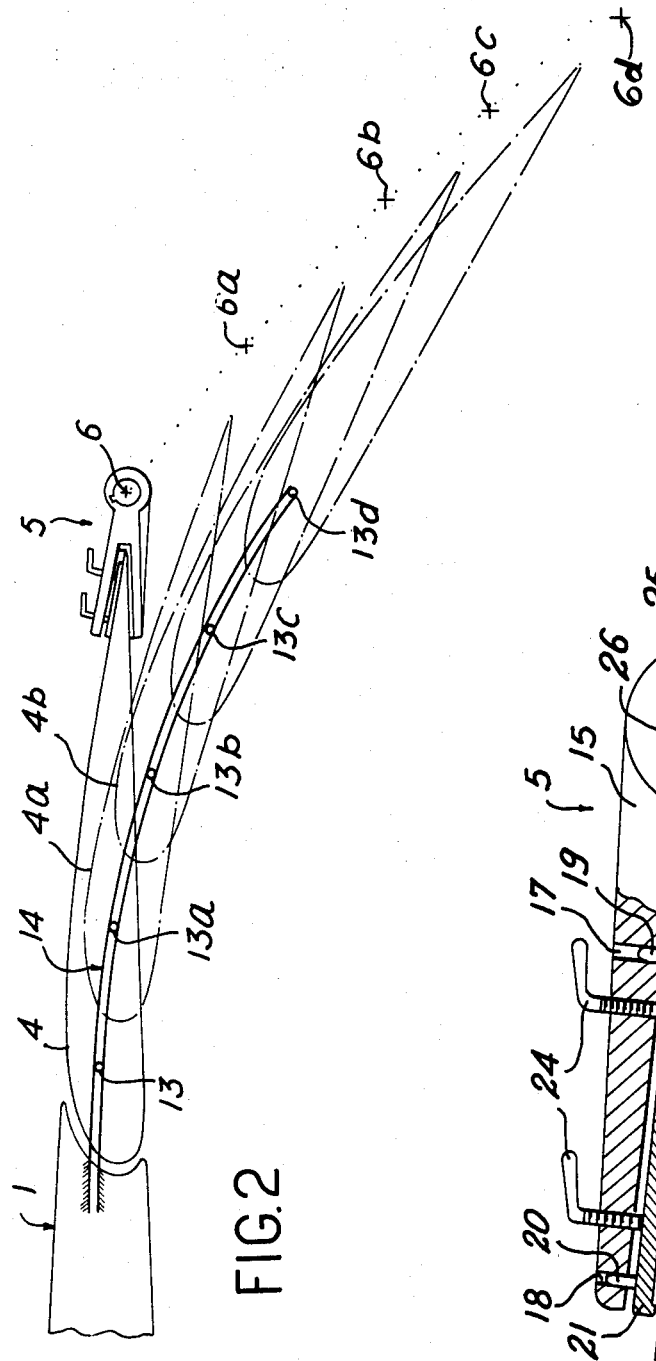
FIG. 2 is a sectional view illustrating several successive positions occupied by one of the wing flaps the clearance curve of which is being checked.
FIG. 3 is a sectional view in a larger scale of the tip of one of the movable wing flaps.

FIG. 2 shows schematically the kinematics of the extension of the preceding wing flaps, for instance wing flap 4, with respect to wing 1 during its movement, whereby said wing flap 4 is supported at each one of its ends by rollers such as 13, set in a groove 14, forming a guiding rail in a solid spar of wing 1, allowing flap 4, as this roller runs along this rail, to progressively extend out of the wing and toward the lower part of the wing in the manner explained above. In FIG. 2, the wing flap 4 and one of its rollers 13, are shown in five successive positions, respectively set from 4 to 4d and from 13 to 13d. Clip 5 which supports source 6 is fixed against the trailing edge of wing flap 4 and carries source 6 in five successive positions shown at 6 to 6d. The curve traveled under these conditions by source 6, an approximation of which is obtained by joining the preceding positions, is recorded continuously on the film of the camera 8 and provides a deduction from its tracing of the corresponding profile of rail 14. The measurements of the difference between the curve obtained and the theoretic curve thus defines the size and the location of possible distortions of the rail which produce the variations of the position of the wing flap itself.

FIG. 3 shows in larger scale, the construction detail of clip 5 wihich for, mounting, on a prolongation of the trailing edge of wing flap 4 the source of radiation 6. This clip is composed of two jaws 15 and 16 linked one to the other around a common axis located toward the rear of wing flap 4, jaw 16 engaging under the under-surface of this wing flap, and jaw 15 being clipped on the upper-surface. Jaw 15 has two guiding holes 17 and 18 for two lugs 19 and 20, engaging a support plate 21, pressing the extremity of wing flap 4 against jaw 16 of the clip, Two leaves 22 and 23 of an appropriate plastic material may be interposed between jaw 16 and plate 21 to prevent damage, by the clip to this part of the wing flap which, due to its thinness, is particularly fragile. The regulation of the position of the support plate 21 with respect to the jaw 16 is obtained by a set screw 24, by adjusting the necessary pressure. The two jaws 15 and 16 are recessed at 25 at the outside of the wing flap, so as to permit the engagement in the recess of a transversal sleeve (not shown) which supports source 6. The positioning of said sleeve in the clip is provided by a staggered groove 26, having a given inclination with respect to the horizontal The process of the invention is carried out in the following way, which can be deduced from the preceding explanations and description. Clip 5, carries source 6 which is fixed on the wing flap 4 to be checked, the camers 8 is mounted on the tip 10 at the end of the wing 1 and adjusted on its support 9 so that its optical axis is oriented between the two fixed sights 11 and 12. Preferably but not exclusively, source 6 is a mercury vapor lamp, which emits ultra violet rays, so that the photographs taken by camera 8 are not influenced by the surrounding light. It is of advantage to have before source 6 an optical system (not shown), which concentrates the light transmitted in a pin point zone. In front of the shutter of camera 8, which is always kept open, an appropriate filter is placed so that the film in the camera is not exposed by the surrounding light. The focusing of the lense is regulated over the distance which separates the source and the film since this distance can be variable according to the position of the source on the wing flap. The installation of source 6 and of the camera being completed, the position of the shutter 7 is adjusted to uncover source 6, then the wing flap 4 is extended and, the position of source 6 is then registered permanently on the sensitive film in the camera. This operation which takes about 25 seconds exposes on the film, since the shutter of the camera remains constantly open, a continuous curve which represents the real trajectory of the light source and thus the profile of the guide rails 13 of the wing flap 4. The shutter of camera 8 is then closed, and the sensitive film which has been exposed is then developed, either by classical means, or through automatic means, in a complete system as illustrated schematically on FIG. 4. In particular, the film coming out of camera 8 is developed in one or several vats of a suitable installation 30, it passes through a drier 31, is enlarged to a useful size at 32, is then printed on proof 33, preferably on a plastic support particularly of polyester in order to assure a perfect print whatever the hygrometric conditions may be before being placed on a reading plate 34 on which there is reproduced the theoretical curve which corresponds to the reference extension of the wing flap in question with a absolutely undistorted profile of the guide rails. The photographic proof 3 to be examined may be positive or negative, as long as the light tracing corresponding to the movement of the source appears either in black or white as a clear contrast on the background of the inverse color. The differences measured between the two curves on plate 34 allows an analysis of the size of the possible distortions undergone by the rails.

Once the measurements are made for the wing flap 4, the same measurements are made for each one of the other wing flaps of wing 1, which are already fitted with identical clips 5 and sources 6, the controlled positioning of the shutters 7 for each one of said sources, thus permitting selective recording of all of the necessary curves without one interferring with the other. A motor added to camera 8 permits changing of the sensitive film before each exposure. It should be noted that, in order to proceed with the recording of all the curves without modifying the position of the camera 8 on its support 9, the camera should have a sufficient depth of field, so that the image in each case is clear.

It will be noted that in the preceding example, the angular movement of any wing flap is about 55° between its initial position and its maximum final position. Source 6, constituted by a mercury vapor lamp, cannot tolerate such a movement under these conditions, particularly due to the liquid mercury which it contains, and therefore a special feature of the invention consists in orienting said source in the initial position so that it already presents a median inclination on the horizon but in the reverse sense of the movement. Therefore groove 26 in recess 25 of the clip 5, is inclined upwards at about 45° in relation to the pivoting direction of the wing flap, which allows for the final position of this wing flap after a pivoting of 55°, to give the lamp an inclination toward the other side of only about 10° without modifying the relative recording conditions.

It is understood that the installation of the different elements of the measuring system as described before, may be subject to many variations, and the source of radiation and the camera could particularly have an inverse position since only their relative movement is of importance. further the procedure could be applied to the checking of the extension curve of the wing flaps, not only when the airplane is on the ground, but also when it is in flight. In this case, the camera taking the pictures 8 for obvious reasons, should not be at the tip of the wing but it should be incorporated into the fuselage of the airplane. The trajectory of a luminous point connected to each one of the wing flaps, can thus be filmed and then directly reproduced on a screen located in the pilot compartment and on which is inscribed in advance the theoretical comparison curve. A position control can be incorporated in order to correct based on the differences measured between the two curves, the lift or the drag of the plane, by raising or lowering said wing flaps.

It should be noted that the source of radiation used can vary, for instance it can be a heating element which provides an infra red radiation, or it may be a deposit of luminescent paint. The sources linked to the different wing flaps could provide monochromatic lights of different wave lengths.

I claim:

1. Process for controlling the movement of at least one movable component, particularly of wing flaps or ailerons of an airplane, the steps of mounting on a reference point of the movable component which is to be checked a pin point transmitter of radiation, mounting a directional receiver at a reference position fixed with respect to the support for the movable component, said directional receiver being sensitive to said radiation, recording with said receiver the curve described by said transmitter during movement of the movable component, comparing said recorded curve with a reference curve corresponding to the theoretical movement of said component and including the step of resetting the starting point of the curve recorded by said receiver with respect to two fixed guide sights mounted on the support for the movable component.

2. Control process according to claim 1 including the step of providing each movable component with a different pin point transmitter and selectively recording with one common receiver all curves from transmitters on said components.

3. Control process according to claim 1, said pin point transmitters being an ultra violet radiation source and said receiver including a camera with a lense having a variable focus the shutter of which is permanently opened in front of a film that is sensitive to ultraviolet radiation and insensitive to the surrounding light.

4. Control process according to claim 3, including the step of making a proof of said film contrasting the tracing of the transmitter curve and the guide sights.

5. Control process according to claim 1, including the step of positioning in front of said transmitter a retracable shutter with a remote control for separate recording of the curves corresponding to each movable component.

6. Control process according to claim 1, each transmitter being a source of monochromatic light which differs from one transmitter to another, for simultaneous recording of all the curves on the same sensitive film.

7. Process according to claim 1, said transmitter providing an infrared radiation, said receiver being responsive to said radiation.

8. Apparatus for measuring the movement of movable components of an aeorplane wing comprising at least one transmitter of pin point radiation connected to the movable component to be checked, one directional receiver fixed with respect to the support for the movable component and sensitive to said radiation, means for recording the curve described by said transmitter with respect to said receptor and means for comparing and measuring the differences between the recorded curve and a theoretical reference curve.

9. Apparatus according to claim 8, said transmitter being a source of ultraviolet light, said receiver being a camera, and said recording means being a sensitive film and said comparing means including means for developing and increasing the size of the film and a reading and examining plate.

10. Process according to claim 1, said transmitter providing radiation from a deposit of luminescent paint, said receiver being responsive to said radiation.

* * * * *